Feb. 28, 1967  P. C. ARNOLD ETAL  3,306,642
WELDED JOINT OF LAMINAR CONSTRUCTION AND APPARATUS USING SAME
Filed June 2, 1964
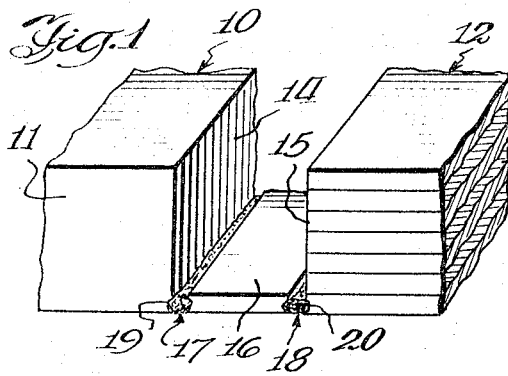
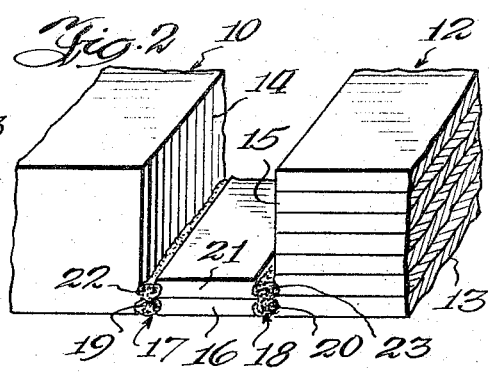
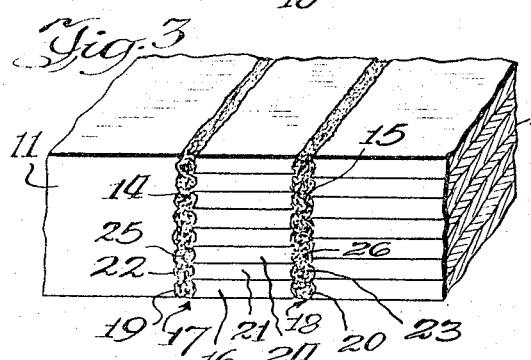
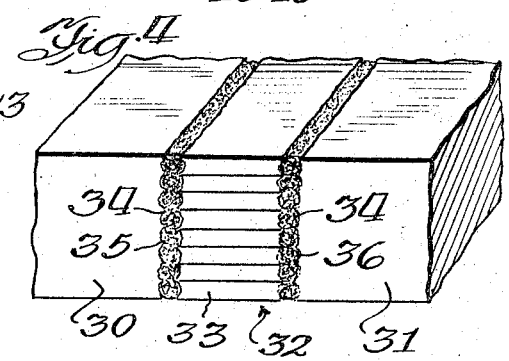
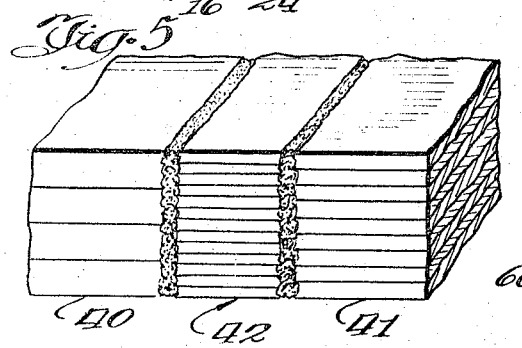
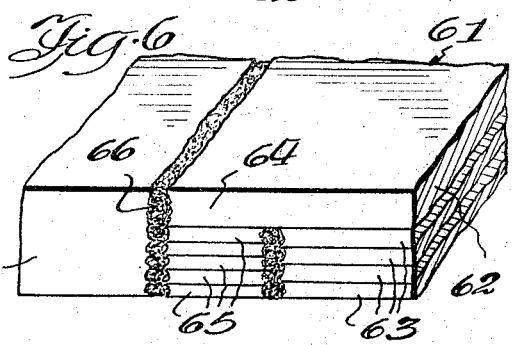
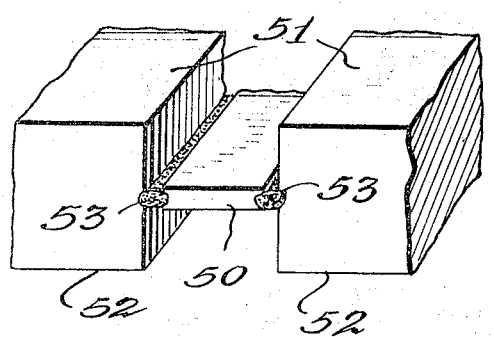
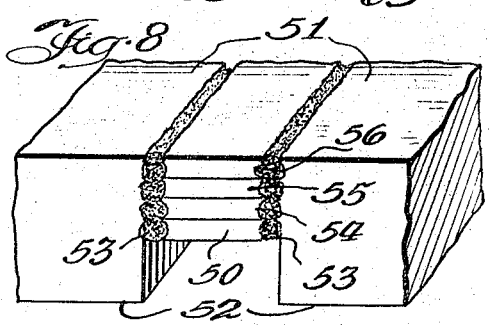
Inventors
Perry C. Arnold
Herman A. Stanick
Lyle V. Larsen
By Merriam, Smith & Marshall
Attorneys

United States Patent Office 3,306,642
Patented Feb. 28, 1967

3,306,642
WELDED JOINT OF LAMINAR CONSTRUCTION
AND APPARATUS USING SAME
Perry C. Arnold, Western Springs, Herman A. Stanick, Blue Island, and Lyle V. Larsen, Elmhurst, Ill., assignors to Chicago Bridge & Iron Company, Oak Brook, Ill., a corporation of Illinois
Filed June 2, 1964, Ser. No. 372,021
7 Claims. (Cl. 287—189.36)

This invention relates to welded joints and methods of making the same. More particularly, this invention is concerned with novel joints for connecting objects having thick walls and methods useful therein.

In the construction of many metal objects or structures it is necessary to join together wall structures which are of considerable thickness, such as of 3 inches in thickness or more and particularly, structures having walls of 6-inch thickness or over. Such heavy walls are required in vessels used for storing and processing a wide variety of materials. Such walls can be solid, that is, of a single plate material, or they can be of the laminar or multiple layer type in which a plurality of rather thin sheet or plate materials are laminated together. Such vessels are of many sizes and shapes but are often cylindrical with elliptical or spherical ends although it is quite common to use heavy or thick walled spherical vessels.

The size of the vessels and the thickness of the walls require that they be produced in manufacturing plants in sections and then transported to the erection site for assembly. Such erection and assembly in the field has required the deposition of large amounts of welding metal in order to properly join the sections together. This is undesirable because to meet code pressure vessel requirements, stress relief of such heavy welded joints may be required and this is often difficult or at least highly inconvenient and expensive to perform in the field. There has thus been a need for a joint structure which can be used conveniently and effectively in the field for joining together heavy walled elements or sections of structural objects and which joint structure may avoid the need for subsequent stress relief thereof under some circumstances.

According to the present invention, there is provided a novel joint structure in which two metal objects having walls of substantial thickness are joined together by a plurality of metal strips in stacked arrangement positioned between opposing spaced apart wall edge face surfaces with welding metal used to bond adjacent edges of the metal strips to the wall edge face surfaces.

The joint of this invention is produced by placing two metal objects having opposing spaced apart edge face surfaces in substantial alignment, positioning a metal strip between the wall edge face surfaces, fusion welding the strip longitudinal side edges to the edge face surfaces, applying a second metal strip between the edge face surfaces and in contact with the first strip, fusion welding the side edges of the said second metal strip to the wall edge face surfaces and to the weld deposit holding the first metal strip and similarly welding in place between the wall edge faces similar metal strips until the two metal objects are joined together with sufficient strength for serviceable use.

The invention will be described further in connection with the attached drawings in which:

FIGURE 1 is an isometric end view of two thick walled objects, one of which is solid and the other laminar, having opposing edge face surfaces with a metal strip therebetween welded at its edges to the edge face surfaces of the opposing walls;

FIGURE 2 is similar to FIGURE 1 except that a second metal strip has been welded in place between the edge face surfaces of the walls;

FIGURE 3 is similar to FIGS. 1 and 2 except that a plurality of additional metal strips have been welded in place between the opposing edge face surfaces of the walls to complete the joint;

FIGURE 4 is an isometric view of a completed joint of this invention in which two solid wall objects are joined together by a series of metal strips positioned stack-wise between opposing edge face surfaces of the walls and welded individually to said wall edge face surfaces before the next adjacent strip is welded in place;

FIGURE 5 is an isometric view in which two heavy walled laminar objects are joined by a series of metal strips positioned stack-wise between opposing wall edge face surfaces and welded in series to the wall edge face surfaces;

FIGURE 6 is an isometric view of one solid, and one laminar, plate joined to each by thin metal strips;

FIGURE 7 is an isometric view showing a laminar joint being started by positioning a metal strip intermittent the top and bottom surfaces of the walls being joined together; and FIGURE 8 is a view of the same plates of FIG. 7 after additional metal strips have been welded in the joint.

In the drawings, the same numbers will sometimes be used in different figures to designate the same or similar elements or parts.

With reference to FIG. 1, object 10 has a thick solid wall 11 while object 12 has a thick laminar or multiple layer metal wall 13. Each of the walls 11 and 12 are positioned so that edge face surfaces 14 and 15 are in spaced apart arrangement from each other. Advisably these surfaces are flat and substantially smooth. Furthermore, these surfaces are advantageously located in parallel planes to each other.

The two thick walls 11 and 13 are shown of approximately the same thickness although the subject invention is equally applicable for joining two thick walls of unequal thickness, it being understood that a joint for unequally thick walls can be thinner, about equal or thicker than the thickness of the thinner of the two walls.

Positioned between opposing edge face surfaces 14 and 15 is strip 16 advisably of a thin metal material which is readily weldable to the surfaces of the adjacent walls. The width of the metal strip 16 is slightly less than the distance between the opposing walls 14 and 15 so as to provide gaps 17 and 18 into which welds 19 and 20 can be placed by fusion deposition of welding material, such as by the gas or electric processes. Care is advisably employed in depositing welds 19 and 20 so that the upper surfaces of the welds are maintained no higher than the upper surface of the metal strip 16. Although the welds can go above the upper surface of the strip 16, the next metal strip used in the joint will not lay smoothly against the lower strip unless means are used to level the weld, such as grinding or other appropriate methods before the next strip is welded in place, or the width of the next strip is reduced in width to clear the raised weld area.

The structure of FIG. 2 is identical to that of FIG. 1, except that the second metal strip 21 has been positioned between the opposing edge face surfaces of the walls and welds 22 and 23 deposited to bond the edges of the strip 21 to the walls with these welds also bonding the edges of the strips 16 and 21 to each other. The welds 22 and 23 should be carefully deposited so as to be maintained no higher than the upper surface of the strip 21, thus avoiding subsequent grinding to prepare the surface for positioning the next strip in place thereon.

FIG. 3 illustrates a completed joint which is obtained according to this invention following the operations already described with regard to FIGS. 1 and 2 and then similarly applying additional metal strips. Thus, after the strip 21 has been welded in place, strip 24 can be positioned in contact with strip 21 and welded in place by welds 25 and 26. Similarly, additional strips can be welded into place successively with the side edges of each strip being welded to the edge face surfaces of the walls and to the strip immediately therebelow before the next strip is positioned and welded in place. In this manner the strips are sequentially bonded in place until sufficient strips have been used to complete a joint of desired thickness.

Although the joint structure described in connection with FIGS. 1 to 3 is concerned with joining a solid wall section to a laminar wall section, the subject invention is equally suitable for joining together two solid wall sections as shown in FIG. 4. Thus, with reference to FIG. 4, solid wall section 30 is joined to solid wall section 31 by the laminar joint structure 32 composed of a series or stack of relatively thin metal strips 33 positioned between the edge face surfaces 35 and 36 of the walls 30 and 31. Each of the metal strips 33 is welded at its longitudinal side edges to the wall edge face surfaces by fusion welds which advisably do not project above the upper surface of the metal strip being welded in place with such welds. As each subsequent metal strip is positioned in place it is welded in a similar way to the edge face surfaces of the walls and in so doing, it is also welded at the side edges to the edges of the metal strip immediately therebelow. In this way, the series of metal strips is welded in place between the edge face surfaces of the walls until a sufficient number have been welded in place to produce a joint of the desired thickness and strength. The metal strips can be added until the joint is any suitable thickness but are often added until the joint is at least about as thick as the thinnest wall being joined together. Furthermore, the metal strips used in forming the joint can be selected of such thickness so that the total thickness thereof used in the joint will approximate the thickness of the thinnest wall in the joint. Where both walls are of the same thickness, such as solid walls 30 and 31, the resulting joint can have a thickness approximately the same as both walls. The resulting joint, furthermore, can have a continuous weld 34 for the total thickness of the strips with the weld being positioned at each edge of the stack of strips. Such welds 34, however are composed of a series of individual weld passes used to weld the metal strips to the adjacent wall structures.

As shown in FIG. 5, the subject invention also comprises joint structures in which both wall sections are of the laminar or multiple layer type. Thus, wall section 40 is composed of four metal layers shown to be of equal thickness although they can be of different thicknesses. Wall section 41 is also of the laminar type and is made up of a plurality of metal sheet or plate layers which, as shown in the drawing, is a total of nine different layers. The wall sections 40 and 41 are joined together by a plurality of thin metal strips 42 positioned between the edge face surfaces of the walls and are welded at the edges to said walls in the same manner as already described with regard to FIGS. 1 to 4.

Although it is suitable to position the first metal strip at either the top or bottom of the joint being produced and to position the subsequent strips thereover until the joint is built up to the desired thickness it is sometimes advisable, particularly in the joining of exceptionally thick walled sections and also where assembly can be speeded up, to position the first metal strip intermittent the inner and outer wall surfaces. As shown in FIGS. 7 and 8, the first metal strip 40 can be welded 53 in position approximately centrally of the inner and outer wall surfaces 51 and 52 and additional metal strips 54, 55 and 56 welded in place. The strips can be welded in place on alternate sides of the first strip or on both sides simultaneously. The additional metal strips welded in place on one or both sides of the partially completed joint until the joint is made up of a sufficient number of metal strips welded in place to obtain a joint of sufficient thickness. Obviously, such strips can be welded in place until the laminar joint has a thickness approximately the same as the thickness of one or both of the wall sections themselves.

Joint structures as described herein can be used to join wall sections which are essentially flat, as well as curved wall sections. The joint structure of this invention is particularly useful for making girth seam joints on cylindrical or spherical objects. In such joints the metal strips used therein can be arced prior to positioning in the joint area or, in the case where the strips are relatively thin, they can be formed into arcs as they are welded into place Thus, it is possible for the entire laminar joint between the wall sections to be made of a single metal strip which is wound around and around with simultaneous welding until the joint is built up of sufficient thickness to give the desired strength. Alternatively, each strip layer used for the laminar joint can be made up of one or more pieces of strip metal.

Although the invention has been described with reference to wall sections having spaced apart opposing edge face surfaces lying in parallel planes, it is feasible to produce laminar joints using the subject method in which the opposing edge surfaces are in oblique planes with respect to one another, with the distance between such faces being approximately the same for the entire length of the joint. In other words, instead of having faces in the joint which are perpendicular to the wall surfaces, the joint faces of the walls can be slightly bevelled to a somewhat V shape when positioned opposite each other. The joining of such wall edges, however, may require progressively increasing the width of metal strips as the laminar joint is built up so that the amount of weld deposit used to weld the edge of each strip to the adjacent edge surface can be minimized. Because of the complicating factor of utilizing a series of metal strips of different widths, it is generally more suitable to join the edges of walls or plates which lie in parallel planes. Joining the edges of such walls permits the use of metal strips of the same width. Furthermore, while the metal strips can vary in thickness, it is generally far more convenient to use metal strips which are all of the same thickness.

In producing the joint of the subject invention in which one or more of the walls being joined together is of the laminar type, it is not essential that the metal strips be of the same, or lesser, or greater, thickness than the sheet or plate material forming the lamina of the wall section.

The width of the metal strips used in producing the joints of this invention can be of any suitable dimension. Advisably, however, they are not any wider than will conveniently permit the deposition of the fusion welds in place. Wide enough strips are employed to permit convenient access by the necessary welding equipment for convenient deposition of a high-quality weld in the gap between the edge of the strip and the edge surface of the wall section. By using relatively thin strip lamina and small weld deposits for the joint structure, it is possible that stress relief of the joint may not be required to meet code requirements. This is of particular advantage in field assembly of large thick walled structures.

Although the strips are generally used of such thickness as to require at least one weld pass to weld the strip edge to the wall surface it is feasible to position two or more thin strips in position and weld them securely in place with a single weld pass per strip edge.

In FIG. 6, there is shown a joint in which solid plate 60 is joined to laminar plate 61. Place 61 has a base sheet or plate 62 to which sheets 63 are tightly laminated. Sheet 62 extends beyond the ends of plates 63 to provide a lip portion 64 which can support strips 65 placed in the joint space and welded in place by a series of welds which weld each of the strips securely to plates 60 and 61. The lip portion 64 is useful as an inside support for the strips 65 when they are positioned tightly in place as in a girth seam joint of a cylindrical vessel. The weld 66 at the end of the tongue can be made from one or both sides prior to welding the strips 65 in place.

The foregoing detailed description has been given for clearness of understanding only, and no unnecessary limitations should be understood therefrom, as modifications will be obvious to those skilled in the art.

What is claimed is:

1. The method of joining together two metal objects of substantial thickness having opposing spaced apart edge face surfaces located in parallel planes to each other comprising positioning a metal strip laterally between the edge faces, said strip being of less width than the distance between the edge faces to provide a gap between each longitudinal side edge of the strip and the edge face adjacent thereto, fusion welding the longitudinal strip edges to the edge faces by means of a weld of less depth than the thickness of the strip, applying a second metal strip similar to the first strip between the edge faces and in surface contact with the first strip with the side edges of said second strip in general alignment with the corresponding edges of said first strip, fusion welding the said second metal strip to the edge faces and to the weld deposit of the first metal strip and similarly welding in place between the edge faces similar metal strips until the two metal objects are joined together with sufficient strength for serviceable use.

2. The method of claim 1 in which the first strip is positioned intermediate the top and bottom of the edge face surfaces and successive strips are applied to each side of the first strip until the joint is at least as thick as one of the edge face surfaces.

3. The method of claim 1 in which the successive metal strips are of approximately equal width.

4. The method of claim 1 in which the successive metal strips are of approximately equal width and approximately equal thickness.

5. The method of joining together two metal walls having opposing spaced apart edge face surfaces located in parallel planes to each other comprising positioning a metal strip between and perpendicular to the wall edge faces, said strip being of less width than the distance between the edge faces to provide a gap between each longitudinal side edge of the strip and the wall edge face adjacent thereto, fusion welding the longitudinal strip edges to the edge faces with the weld deposit being maintained below the strip top surface, applying a second metal strip between the wall edge faces and in surface contact with the first strip, fusion welding the said second metal strip to the wall edge faces and to the weld deposit of the first metal strip with the weld deposit for the second metal strip being maintained below the strip top surface and similarly welding in place between the edge faces similar metal strips with the weld deposit joining each successive strip being maintained below the strip top surface until the joint between the wall edge faces is about at least as thick as one of the walls joined together.

6. A joint connecting thick walled metal objects which comprises two opposing spaced apart wall edge face surfaces in parallel planes of thick walled metal objects, a plurality of thin metal strips in stacked relationship to one another positioned laterally to and between the wall edge face surfaces, said strips being of less width than the distance between the edge faces to provide a gap between each longitudinal side edge of the strip and the wall edge face adjacent thereto, and fusion deposited weld metal between adjacent wall edge faces and the strip edges bonding the strips to the wall edge faces and the edge of each strip to the edge of adjacent strips, said fusion deposited weld metal being continuous for the thickness of the stack of strips but made up of a plurality of individual weld passes none of which goes above the upper surface of the strip it bonds to the adjacent wall edge face and any lower strip.

7. A joint according to claim 6 in which the metal strips are all of approximately equal thickness and approximately equal width.

References Cited by the Examiner

UNITED STATES PATENTS

| | | | |
|---|---|---|---|
| 1,337,023 | 4/1920 | Patterson | 189—36 X |
| 2,769,227 | 11/1956 | Sykes et al. | 189—36 X |
| 3,103,066 | 9/1963 | Harman | 29—471.1 |

FOREIGN PATENTS 159,914  1921  Great Britain.

HARRISON R. MOSELEY, *Primary Examiner.*

KENNETH DOWNEY, *Examiner.*